(12) United States Patent
Yamamoto et al.

(10) Patent No.: US 11,644,080 B2
(45) Date of Patent: May 9, 2023

(54) LQUID-FILLED VIBRATION ISOLATOR

(71) Applicant: Toyo Tire Corporation, Itami (JP)

(72) Inventors: Hikofumi Yamamoto, Itami (JP);
Ryosuke Uema, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 124 days.

(21) Appl. No.: 17/205,132

(22) Filed: Mar. 18, 2021

(65) Prior Publication Data

US 2021/0317894 A1 Oct. 14, 2021

(30) Foreign Application Priority Data

Apr. 8, 2020 (JP) .............................. JP2020-069944

(51) Int. Cl.
*F16F 13/10* (2006.01)
*F16F 13/26* (2006.01)
*B60K 5/12* (2006.01)

(52) U.S. Cl.
CPC .......... *F16F 13/107* (2013.01); *F16F 13/105* (2013.01); *F16F 13/26* (2013.01); *B60K 5/1208* (2013.01); *F16F 13/106* (2013.01); *F16F 13/264* (2013.01); *F16F 13/266* (2013.01); *F16F 13/268* (2013.01); *F16F 2222/12* (2013.01)

(58) Field of Classification Search
CPC .... F16F 13/107; F16F 2222/12; F16F 13/266; F16F 13/264; F16F 13/268; F16F 13/106; B60K 5/1208
USPC .................................................... 267/104.13
See application file for complete search history.

(56) References Cited

U.S. PATENT DOCUMENTS

| | | | | |
|---|---|---|---|---|
| 4,742,999 A | * | 5/1988 | Flower .................. | F16F 13/106 188/320 |
| 5,104,100 A | * | 4/1992 | Simuttis ................ | F16F 13/106 267/140.13 |
| 6,422,545 B1 | * | 7/2002 | Baudendistel ........ | F16F 13/268 267/140.13 |

(Continued)

FOREIGN PATENT DOCUMENTS

| | | |
|---|---|---|
| JP | 2008-281118 A | 11/2008 |
| JP | 2019-158022 A | 9/2019 |

OTHER PUBLICATIONS

Office Action dated Jul. 5, 2022, issued in counterpart CN Application No. 202110243023.5, with English translation. (8 pages).

*Primary Examiner* — Bradley T King
*Assistant Examiner* — James K Hsiao
(74) *Attorney, Agent, or Firm* — WHDA, LLP

(57) ABSTRACT

Provided is a liquid-filled vibration isolator through which durability of an elastic movable body can be improved. In a case that a liquid pressure of liquid passing through a second orifice P2 is exerted to an outer circumference portion 12 of an elastic movable body 10, whole of the outer circumference portion 12 deforms so as to bend. Based on deformation of the outer circumference portion 12, a first valve portion 13 and facing surfaces 81c, 91c mutually contact or separate. Thereby, the communication state and the blocking state of the second orifice P2 are switched. Since it can be restrained that stress is concentrated in a part of the outer circumference portion 12 by wholly bending the outer circumference portion 12, cracks are less likely to occur in the outer circumference portion 12.

8 Claims, 5 Drawing Sheets

(56) References Cited

U.S. PATENT DOCUMENTS

| | | | | | |
|---|---|---|---|---|---|
| 7,419,144 B2* | 9/2008 | Hasegawa | | F16F 13/106 | |
| | | | | 267/140.13 | |
| 7,857,293 B2* | 12/2010 | Muraoka | | F16F 13/106 | |
| | | | | 267/140.13 | |
| 8,474,799 B2* | 7/2013 | Michiyama | | F16F 13/106 | |
| | | | | 267/140.13 | |
| 8,490,954 B2* | 7/2013 | Saito | | F16F 13/106 | |
| | | | | 267/140.13 | |
| 8,556,239 B2* | 10/2013 | Okumura | | F16F 13/106 | |
| | | | | 267/140.13 | |
| 8,651,467 B2* | 2/2014 | Ishikawa | | F16F 13/106 | |
| | | | | 267/140.13 | |
| 8,783,668 B2* | 7/2014 | Ishikawa | | F16F 13/08 | |
| | | | | 267/140.13 | |
| 8,794,606 B2* | 8/2014 | Kubo | | F16F 13/106 | |
| | | | | 267/140.13 | |
| 9,488,246 B2* | 11/2016 | Satori | | F16F 13/08 | |
| 9,695,902 B2* | 7/2017 | Kadowaki | | F16F 13/106 | |
| 2002/0109280 A1* | 8/2002 | Baudendistel | | F16F 13/268 | |
| | | | | 267/140.14 | |
| 2005/0206055 A1* | 9/2005 | Nemoto | | F16F 13/266 | |
| | | | | 267/140.11 | |
| 2005/0206056 A1* | 9/2005 | Maeno | | F16F 13/106 | |
| | | | | 267/141 | |
| 2006/0157902 A1* | 7/2006 | Sakata | | F16F 13/108 | |
| | | | | 267/140.13 | |
| 2006/0220287 A1* | 10/2006 | Muramatsu | | F16F 13/106 | |
| | | | | 267/140.13 | |
| 2007/0090578 A1* | 4/2007 | Muraoka | | F16F 13/106 | |
| | | | | 267/140.11 | |
| 2009/0140476 A1* | 6/2009 | Michiyama | | F16F 13/106 | |
| | | | | 267/140.13 | |
| 2009/0140477 A1* | 6/2009 | Michiyama | | F16F 13/106 | |
| | | | | 267/140.13 | |
| 2011/0042873 A1* | 2/2011 | Yamamoto | | F16F 13/264 | |
| | | | | 267/140.14 | |
| 2014/0175719 A1* | 6/2014 | Kanaya | | F16F 13/106 | |
| | | | | 267/140.13 | |
| 2015/0316121 A1* | 11/2015 | Kadowaki | | F16F 13/106 | |
| | | | | 267/140.13 | |
| 2016/0223048 A1* | 8/2016 | Kojima | | B60K 5/1208 | |
| 2016/0298716 A1* | 10/2016 | Ueki | | F16F 13/107 | |
| 2017/0023088 A1* | 1/2017 | Kadowaki | | F16F 13/105 | |
| 2017/0030428 A1* | 2/2017 | Ueki | | F16F 13/107 | |
| 2017/0167564 A1* | 6/2017 | Ueki | | F16F 13/107 | |
| 2017/0335920 A1* | 11/2017 | Kanaya | | B60K 5/1208 | |
| 2018/0051769 A1* | 2/2018 | Kim | | F16F 13/106 | |
| 2018/0073591 A1* | 3/2018 | Nagasawa | | F16F 13/107 | |
| 2019/0017568 A1* | 1/2019 | Kim | | B60K 5/1208 | |
| 2019/0285133 A1* | 9/2019 | Ishikawa | | F16F 13/106 | |

* cited by examiner

LQUID-FILLED VIBRATION ISOLATOR

BACKGROUND

Field of the Invention

The present invention related to a liquid-filled vibration isolator, in particular, to a liquid-filled vibration isolator through which durability of an elastic movable body can be improved.

Description of the Related Art

In Japanese Patent Application Laid-open No. 2019-158022 (for example, paragraphs 0056, 0058, 0065 to 0067, 0070 and FIG. 12), it is described a liquid-filled vibration isolator in which a pressure receiving chamber 96 and an equilibrium chamber 98 are communicated by two flow paths of an orifice flow path 104 and a communication flow path 106 (a first orifice and a second orifice). In this technology, a resonance frequency at the time of liquid flowing in the orifice flow path 104 is set to a frequency lower than that of the communication flow path 106, thereby it is constituted so that a communication state and a blocking state of the communication flow path 106 are switched by a valve portion 94 of an elastic movable body 78. Through this technology, when it is conducted a vibration input with a comparatively large amplitude (low frequency), the communication flow path 106 is blocked by displacement of the valve portion 94, therefore it can be obtained a high attenuation coefficient by liquid flowing in the orifice flow path 104. On the other hand, when vibration with a comparatively small amplitude (high frequency) is input, displacement of the valve portion 94 is small and the communication state of the communication flow path 106 is maintained, thus a dynamic spring constant can be lowered though liquid flowing in the communication flow path 106.

SUMMARY OF THE INVENTION

However, in the prior technology described in the above, since it is adopted a constitution that the valve portion 94 is displaced by deforming a thin wall part 88 formed in the elastic movable body 78, cracks occur easily in the thin wall part 88 when the displacement of the valve portion 94 is repeated. Therefore, there is a problem that durability of the elastic movable body 78 will be reduced.

The present invention has been done to solve the above problem and has an object to provide a liquid-filled vibration isolator through which durability of an elastic movable body can be improved.

Problem to be Solved by the Invention

To accomplish the above object, a liquid-filled vibration isolator according to the present invention includes:

a first mounting member;

a cylindrical second mounting member;

a vibration isolation body formed by using rubber elastic body, the vibration isolation body connecting the first mounting member and the second mounting member so as to block an opening portion at one end side of the second mounting member in an axis direction;

a diaphragm formed by using rubber elastic body, blocking an opening portion at another end side of the second mounting member in the axis direction;

a partition member retained within an inner circumference side of the second mounting member between the diaphragm and the vibration isolation body, the partition member partitioning a first liquid chamber at a side of the vibration isolation body and a second liquid chamber at a side of the diaphragm;

an orifice portion formed in the partition member, the orifice communicating the first liquid chamber and the second liquid chamber; and a disc-shaped elastic movable body stored in the partition member and formed by using rubber elastic body;

wherein the orifice portion is constituted from at least a first orifice and a second orifice resonating with higher frequency than the first orifice, wherein the elastic movable body has a retained portion constituting a part of an inner circumference side in the elastic movable body, the retained portion retained in the partition member, an outer circumference portion protruded to an outer side in a diameter direction from the retained portion and arranged in a flow path of the second orifice and a first valve portion protruded to both sides in the axis direction from an outer circumference end side of the outer circumference portion, wherein a circumference wall surface facing to the first valve portion in the diameter direction and forming a flow path with the first valve portion is formed in the second orifice, wherein in the outer circumference portion a size in the diameter direction is set larger than a size in the axis direction, wherein a pair of facing surfaces protruded from the circumference wall surface to an inner side in the diameter direction, the facing surfaces facing to the first valve portion at both sides in the axis direction, are formed in the second orifice, and wherein a communication state and a blocking state of the second orifice is switched based on that the first valve portion contacts with or separates from the facing surfaces.

According to the liquid-filled vibration isolator described in the first embodiment, following effects can be realized. Since the size of the outer circumference portion of the elastic movable body in the diameter direction is formed larger than the size in the axis direction, when liquid pressure of liquid passing through the second orifice is exerted to the outer circumference portion of the elastic movable body, the outer circumference portion of the elastic movable body is deformed so as to wholly bend, thus the first valve portion is displaced in the axis direction based on deformation of the outer circumference portion. Since in the second orifice a pair of facing surfaces protruded from the circumference wall surface to the inner side in the diameter direction, facing to both sides of the first valve portion in the axis direction are formed, the first valve portion is displaced in the axis direction and contacts with or separates from the facing surface, thereby communication state and the blocking state of the second orifice can be switched.

As mentioned, based on that the outer circumference portion of the elastic movable body is deformed so as to wholly bend, it can be restrained that stress concentrates to a part of the outer circumference portion at the time of deformation. Therefore, even if deformation is repeated in the outer circumference portion of the elastic movable body, cracks are less likely to occur, thus, there is an effect that durability of the elastic movable body can be improved.

According to the liquid-filled vibration isolator described in the second embodiment, following effects can be realized in addition to the effects realized by the liquid-filled vibration isolator described in the first embodiment.

In the liquid-filled vibration isolator, the first valve portion and the facing surface mutually separate in a state before vibration is input, and the liquid-filled vibration isolator further comprises:

a leak flow path formed in at least one of the first valve portion or the facing surface, the leak flow path maintaining the communication state of the second orifice in a case that the first valve portion contacts with the facing surface when vibration with a first predetermined amplitude is input.

Thereby, in a case that vibration with a first amplitude is input, liquid flow in the first orifice can be produced while slightly producing liquid flow in the second orifice by the leak flow path. Therefore, there is an effect that when vibration with the first amplitude is input, a predetermined attenuation coefficient can be obtained while restraining that the dynamic spring constant becomes high.

According to the liquid-filled vibration isolator described in the third embodiment, following effects can be realized in addition to the effects realized by the liquid-filled vibration isolator described in the second embodiment. The leak flow path is constituted so as to be able to be blocked by the first valve portion when vibration with a second amplitude larger than the first amplitude is input. Thereby, liquid flow in the second orifice through the leak flow path is restrained when vibration with the second amplitude is input and liquid flow can be produced only in the first orifice. Therefore, when vibration with the second amplitude larger than the first amplitude is input, there is an effect that a high attenuation coefficient can be obtained.

According to the liquid-filled vibration isolator described in the fourth embodiment, following effects can be realized in addition to the effects realized by the liquid-filled vibration isolator described in the third embodiment.

In the liquid-filled vibration isolator, the elastic movable body has a second valve portion formed in an inner circumference side than the first valve portion and protruded in both sides in the axis direction from the outer circumference portion, the second valve portion faces to a pair of the facing surfaces in the axis direction, and a facing clearance of the second valve portion and the facing surface is formed wider than a facing clearance of the first valve portion and the facing surface. Therefore, when vibration with an amplitude less than or equal to the first amplitude is input, it can be restrained that the second valve portion and the facing surface mutually contacts. On the other hand, when vibration with an amplitude exceeding the first amplitude is input, in a case that the second valve portion contacts with the facing surface, rigidity of the outer circumference portion of the elastic movable body is raised by contact thereof, therefore it can be restrained that liquid pressure is adsorbed by deformation of the outer circumference portion of the elastic movable body when vibration is input. Therefore, when vibration with the amplitude exceeding the first amplitude is input, there is an effect that the high attenuation coefficient can be obtained.

According to the liquid-filled vibration isolator described in the fifth embodiment, following effects can be realized in addition to the effects realized by the liquid-filled vibration isolator described in the fourth embodiment.

When vibration with the second amplitude is input, since the second valve portion contacts with the facing surface and rigidity of the outer circumference portion of the elastic movable body is raised by contact thereof, it can be restrained that liquid pressure is adsorbed by deformation of the outer circumference portion of the elastic movable body when vibration with the second amplitude is input. Therefore, when vibration with the second amplitude is input, there is an effect that higher attenuation coefficient can be obtained.

According to the liquid-filled vibration isolator described in the sixth embodiment, following effects can be realized in addition to the effects realized by the liquid-filled vibration isolator described in the fourth embodiment.

The leak flow path is formed in at least one of the second valve portion or the facing surface, the leak flow path maintaining the communication state of the second orifice in a case that the second valve portion contacts with the facing surface. Therefore, even if the second valve portion contacts with the facing surface when vibration with the first amplitude is input, liquid flow in the second orifice can be produced by the leak flow path. Therefore, when vibration with the first amplitude is input, there is an effect that the predetermined attenuation coefficient can be obtained while restraining that the dynamic spring constant becomes high.

According to the liquid-filled vibration isolator described in the seventh embodiment, following effects can be realized in addition to the effects realized by the liquid-filled vibration isolator described in the sixth embodiment.

The leak flow path is constituted so as to be able to be blocked by the second valve portion when vibration with the second amplitude is input. Thereby, when vibration with the second amplitude is input, even if there is a part where blocking of the leak flow path by the first valve portion is insufficient, it can be restrained that liquid flow in the second orifice through the leak flow path is produced. Therefore, since liquid flow can be produced only by the first orifice, when vibration with the second amplitude is input, there is an effect that the high attenuation coefficient can be obtained.

According to the liquid-filled vibration isolator described in the eighth embodiment, following effects can be realized in addition to the effects realized by the liquid-filled vibration isolator described in any one of the forth to seventh embodiments.

A size in the axis direction of the outer circumference portion of elastic movable body is formed to be constant in an area where the first valve portion and the second valve portion are not formed. Therefore, when the outer circumference portion of the elastic movable body deforms, it can be restrained that stress concentrates in a part of the outer circumference portion. Thus, there is an effect that durability of the elastic movable body can be improved.

According to the liquid-filled vibration isolator described in the ninth embodiment, following effects can be realized in addition to the effects realized by the liquid-filled vibration isolator described in the second embodiment.

A flow path width of the leak flow path is formed narrower as going to the inner side in the diameter direction. Therefore, even if there is a part where blocking of the leak flow path by the first valve portion is insufficient, flow resistance of liquid flowing in such part can be raised. Thus, when vibration with the second amplitude is input, there is an effect that the high attenuation coefficient can be obtained.

According to the liquid-filled vibration isolator described in the tenth embodiment, following effects can be realized in addition to the effects realized by the liquid-filled vibration isolator described in the second embodiment.

The partition member has a sandwich portion to sandwich a part of the outer circumference portion in a circumference direction from an up and down direction. Therefore, deformation of a part of the outer circumference portion is bound by the sandwich portion. In an area where the deformation of the outer circumference portion is bound, blocking of the leak flow path by the first valve portion may become insufficient, on the other hand, the leak flow path is formed at a position different from the sandwich portion in the circumference direction. That is, since the leak flow path is formed in an area where deformation of the outer circumference portion is not bound, the leak flow path is easily blocked by displacement of the first valve portion due to deformation of the outer circumference portion. Thus, when vibration with the second amplitude is input, there is an effect that the high attenuation coefficient can be obtained.

According to the liquid-filled vibration isolator described in the eleventh embodiment, following effects can be realized in addition to the effects realized by the liquid-filled vibration isolator described in the second embodiment.

The leak flow path is formed by a recess portion formed on the facing surface of the second orifice. Therefore, accuracy of size such as the flow path width of the leak flow path or the depth can be improved, in comparison with a case that the recess portion is formed in the first valve portion which is rubber elastic body. Thus, since flow amount of liquid passing through the leak flow path can be easily set to the intended flow amount, when vibration with the first amplitude is input, there is an effect that the intended dynamic spring constant and the attenuation coefficient can be easily obtained.

According to the liquid-filled vibration isolator described in the twelfth embodiment, following effects can be realized in addition to the effects realized by the liquid-filled vibration isolator described in the eleventh embodiment.

It is provided a slope surface connecting the facing surface and a bottom surface of the recess portion in the circumference direction. Therefore, there is an effect that the leak flow path is easily blocked when the first valve portion contacts with the facing surface.

DETAILED DESCRIPTION

Figure 1:
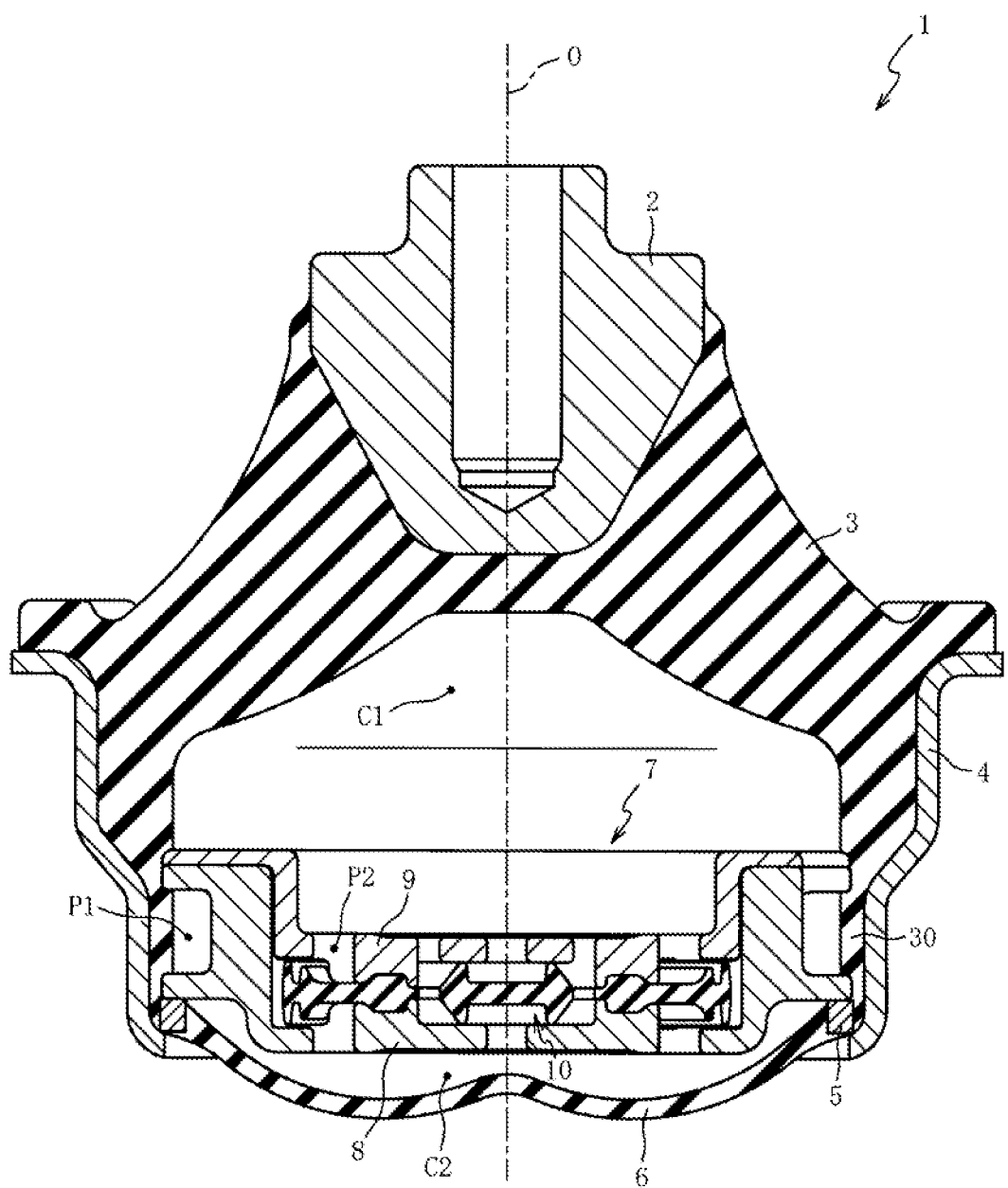
FIG. 1 is a sectional view of the liquid-filled vibration isolator in one embodiment of the present invention.

Hereinafter, a preferred embodiment of the present invention will be described with reference to the attached drawings. FIG. 1 is a sectional view of a liquid-filled vibration isolator 1 in one embodiment of the present invention. Here, in FIG. 1, it is shown a sectional view in which the liquid-filled vibration isolator 1 is sectioned by a plane along an axis-O.

As shown in FIG. 1, the liquid-filled vibration isolator 1 is a vibration isolator supporting and fixing a vibration source side (not shown) such as auto engine to a vibration receiving side (not shown) such as body while restraining vibration transmission from the vibration source side to the vibration receiving side. The liquid-filled vibration isolator 1 has a first mounting member 2 which is mounted to the vibration source side.

The first mounting member 2 is formed in a substantial cylindrical shape by using metal material such as aluminum alloy. In explanation below, the axis-O direction of the first mounting member 2 (second mounting member 4) is a vertical direction and the side of the first mounting member 2 is an upper side of the liquid-filled vibration isolator 1. Further, a direction around the axis-O is a circumference direction and a direction orthogonal to the axis-O (left and right direction of FIG. 1) is a diameter direction.

On an upper surface of the first mounting member 2, a screw hole is formed, and in the screw hole a bolt (not shown) to fix the first mounting member 2 to the vibration source side is fastened. A vibration isolation body 3 is adhered from a lower surface to an outer circumference surface of the first mounting member 2.

The vibration isolation body 3 is formed using a rubber-like elastic body in a substantial truncated cone having a larger diameter as going to a lower side. An upper end side portion of the vibration isolation body 3 is adhered to the first mounting member 2 by vulcanization adhesion and a lower end side portion of the vibration isolation body 3 is adhered to a second mounting member 4 by vulcanization adhesion. The second mounting member 4 is a member which is mounted to the vibration receiving side. Here, it may be conceivable that the second mounting member 4 is mounted to the vibration source side and the first mounting member 2 is mounted to the vibration receiving side.

The second mounting member 4 is formed into a cylindrical using metal material such as steel. The vibration isolation body 3 is adhered so as to block an opening portion of the upper end side (one end side of the axis-O) of the second mounting member 4. To the lower end side of the of the vibration isolation body 3, a rubber membrane 30 covering an inner circumference surface of the second mounting member 4 is integrally formed and a fixture 5 is retained to an inner circumference surface of the lower end side of the second mounting member 4 through the rubber membrane 30.

The fixture 5 is formed into an annular shape using metal material and a diaphragm 6 is adhered to the fixture 5. The diaphragm 6 is formed into a membrane state so as to be bent in bellows by using rubber elastic body. An outer edge of the diaphragm 6 is adhered to the fixture 5 by vulcanization adhesion and the fixture 5 is retained by crimping the lower end of the second mounting member 4, thereby a liquid filled chamber is formed between the vibration isolation body 3 and the diaphragm 6.

In the liquid filled chamber, antifreeze liquid (not shown) such as ethylene glycol is filled. The partition member 7 is retained so as to contact with the rubber membrane 30 on an inner circumference surface of the second mounting member 4 between the vibration isolation body 3 and the diaphragm 6. Through this partition member 7, the liquid filled chamber is partitioned into two chambers of the first liquid chamber C1 at the side of vibration isolation body 3 and the second liquid chamber C2 at the side of diaphragm 6.

In the partition member 7, a plurality (two in the present embodiment) of a first orifice P1 and a second orifice P2 to communicate the first liquid chamber C1 and the second liquid chamber C2 are formed. The partition member 7 is constituted a first partition body 8 in which the first orifice P1 is formed and a second partition body 9 in which the second orifice P2 is formed.

Between the first partition body 8 and the second partition body 9, a disc-shaped elastic movable body 10 is stored. Based on an outer circumference portion of the elastic movable body 10, it is switched a communication state in which liquid flow can be done and a block state in which liquid flow cannot be done, through the second orifice P2.

Figure 2:
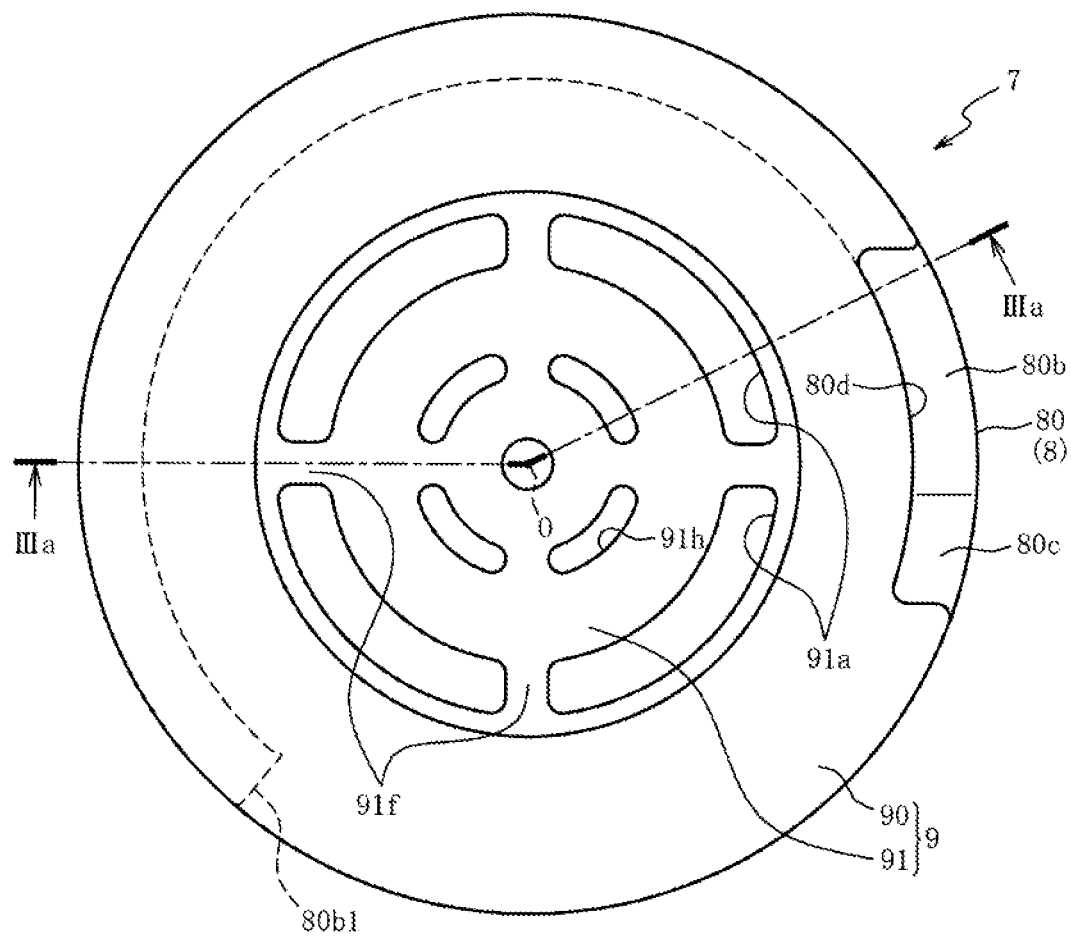
FIG. 2 is a top view of a partition member.
Figure 3A:
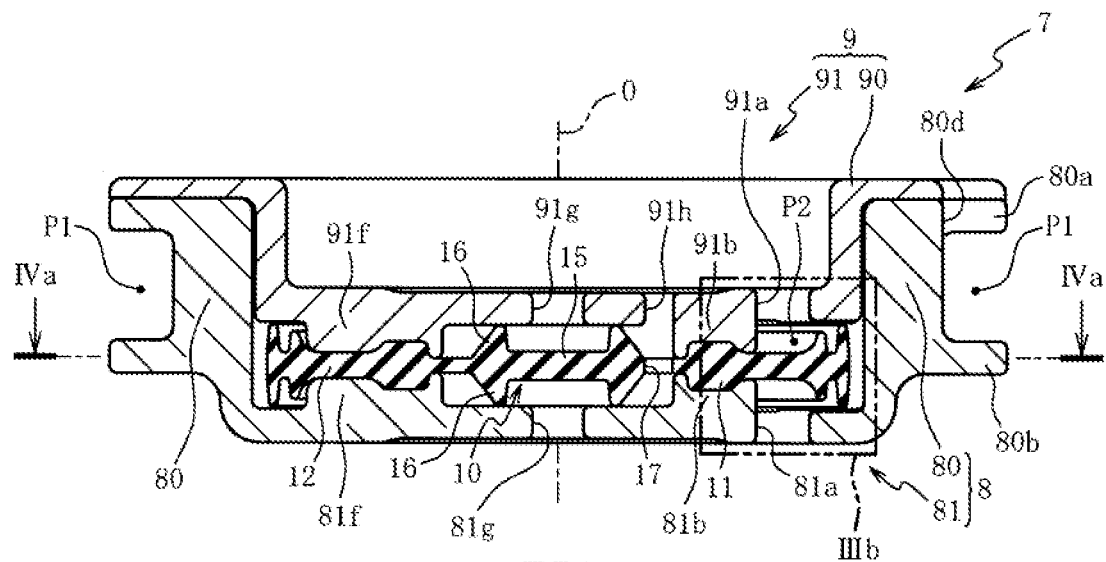
FIG. 3A is a sectional view of the partition member taken along line IIIa-IIIa in FIG. 2
Figure 3B:
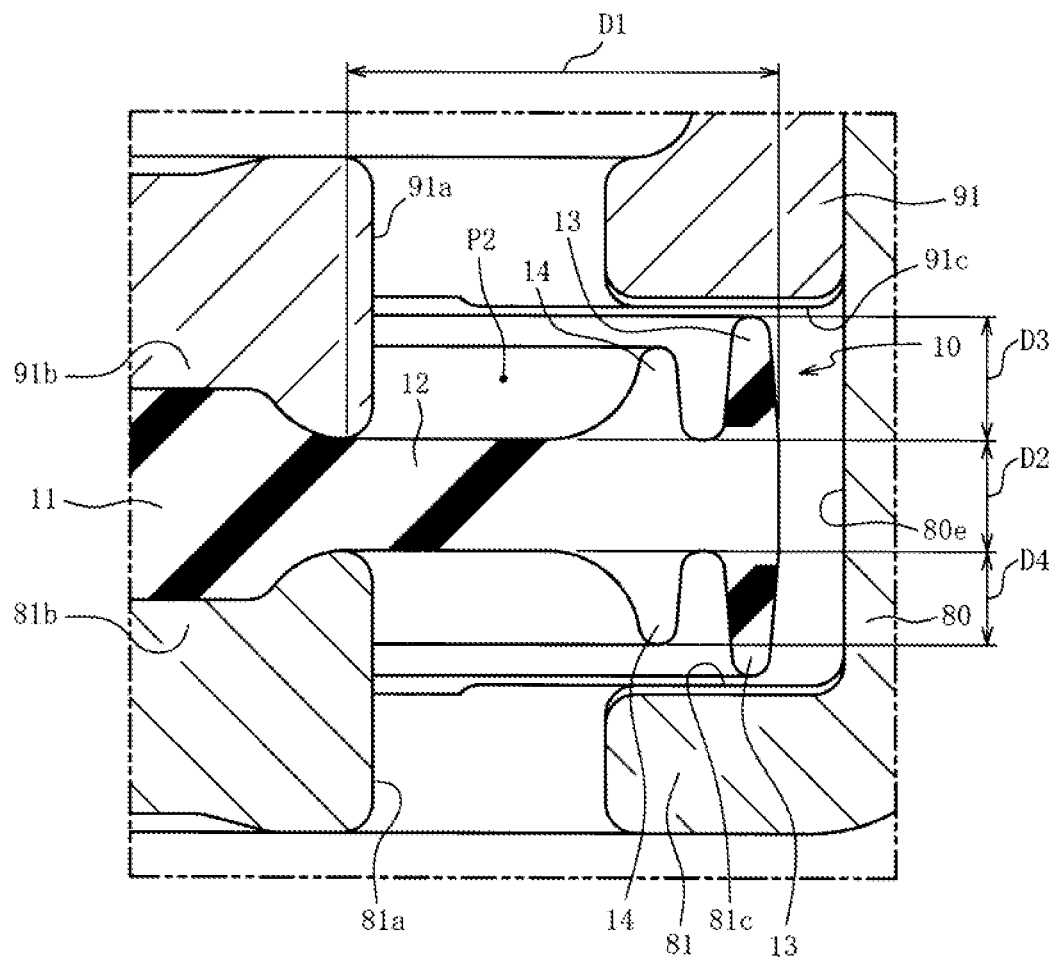
FIG. 3B is a partially enlarged sectional view of the partition member shown by enlarging IIIb portion of FIG. 3A.

Next, with reference to FIGS. 2 to 4, a detailed constitution of the partition member 7 and the elastic movable body 10 will be described. In addition, operation of the above constitution will also be described with reference to FIG. 5 as appropriate. FIG. 2 is a top view of the partition member 7. FIG. 3A is a sectional view of the partition member 7 taken along line IIIa-IIIa of FIG. 2 and FIG. 3B is a partially enlarged sectional view of the partition member 7 shown by enlarging IIIb portion of FIG. 3A. Here, in FIG. 3, it is shown the partition member 7 under a state that the elastic movable body 10 is retained.

Figure 4A:
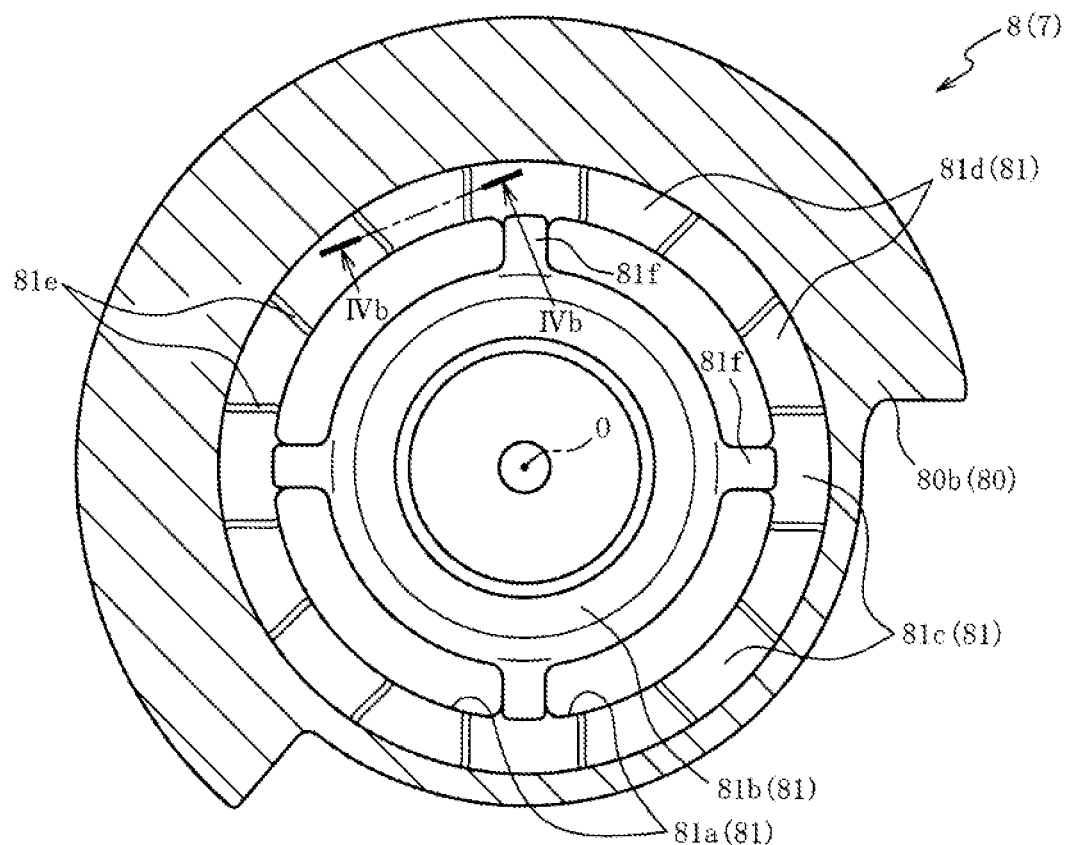
FIG. 4A is a sectional view of the partition member-taken along line IVa-Iva of FIG. 3A
Figure 4B:
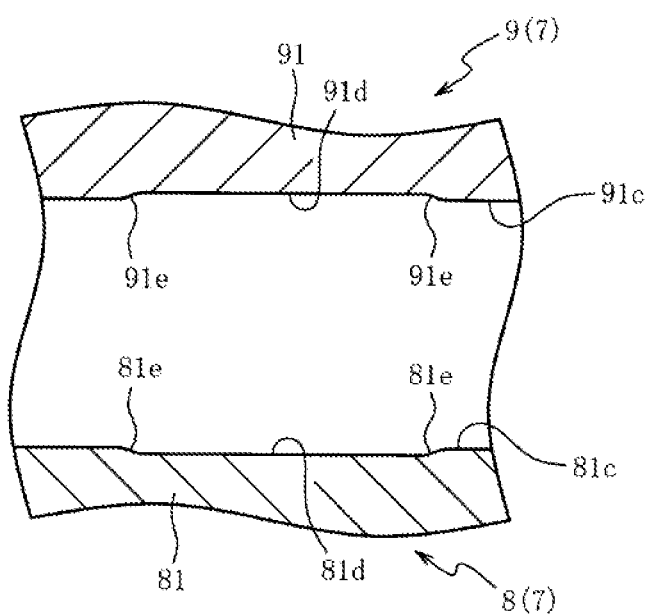
FIG. 4B is a partially enlarged sectional view of the partition member taken along line IVb-IVb of FIG. 4A.

FIG. 4A is a sectional view of the partition member 7 taken along line IVa-IVa of FIG. 3A and FIG. 4B is a partially enlarged sectional view of the partition member 7 taken along line IVb-IVb of FIG. 4A. Here, in FIG. 4, it is shown a sectional view of the partition member 7 under a state that the elastic movable body 10 is removed.

Figure 5A:
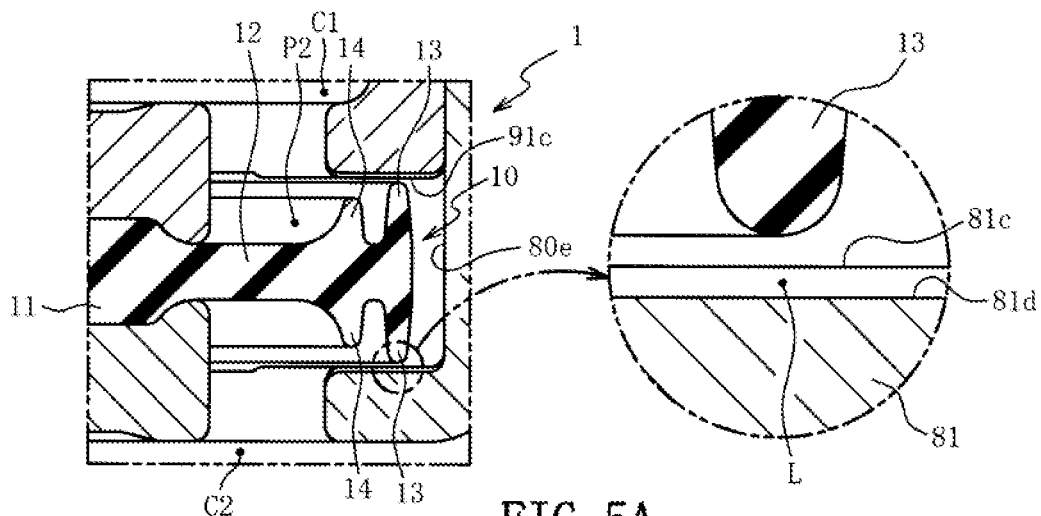
FIG. 5A is a partially enlarged sectional view of the liquid-filled vibration isolator under a load state before vibration is input.
Figure 5B:
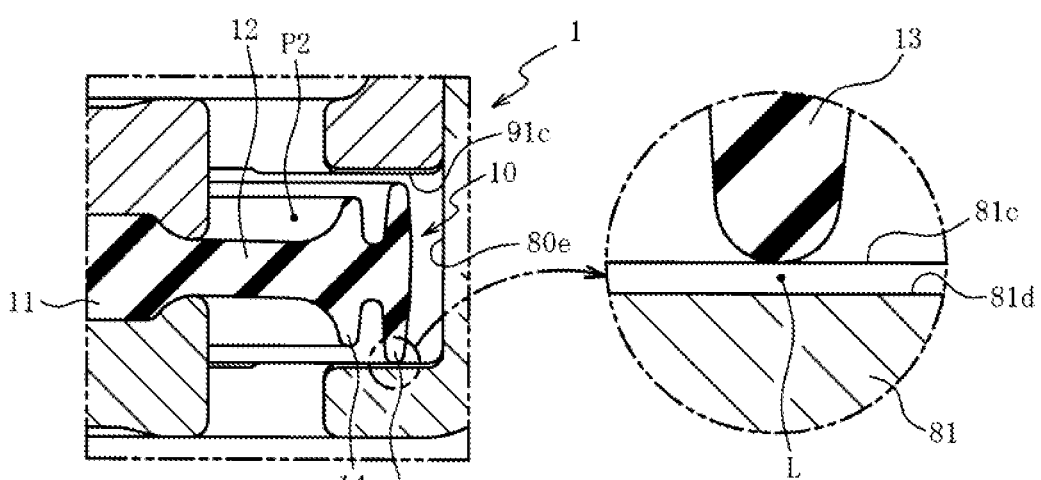
FIG. 5B is a partially enlarged sectional view of the liquid-filled vibration isolator showing a state that vibration with a medium extent amplitude is input from the state of FIG. 5A
Figure 5C:
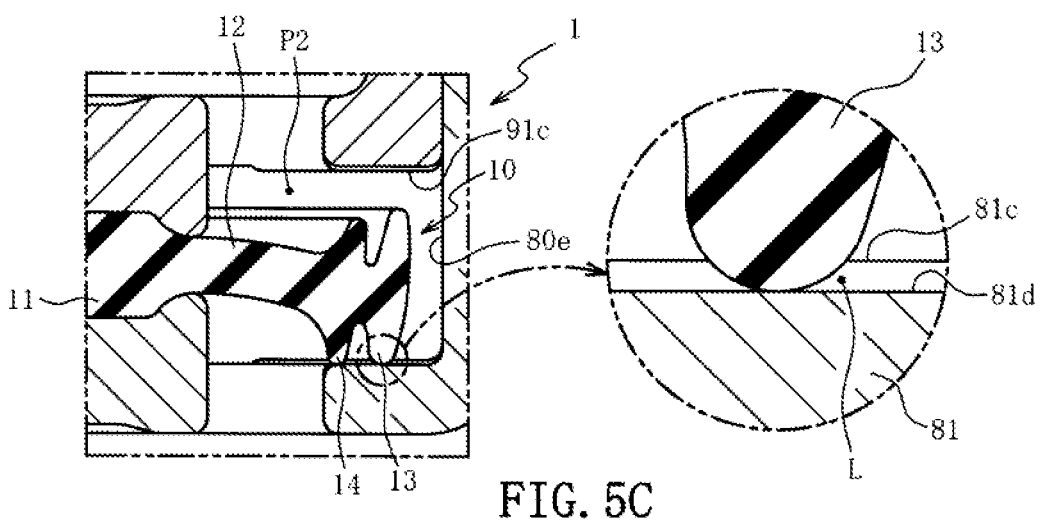
FIG. 5C is a partially enlarged sectional view of the liquid-filled vibration isolator showing a state that vibration with a comparatively large amplitude is input from the state of FIG. 5A.

FIG. 5A is a partially enlarged sectional view of the liquid-filled vibration isolator 1 under a load state before vibration is input, FIG. 5B is a partially enlarged sectional view of the liquid-filled vibration isolator 1 showing a state that vibration with a medium amplitude is input from a state of FIG. 5A and FIG. 5C is a partially enlarged sectional view of the liquid-filled vibration isolator 1 showing a state that vibration with comparatively large is input from a state of FIG. 5A.

Here, the load state (load equilibrium state) before vibration is input is a state that the liquid-filled vibration isolator 1 is assembled between the vibration source side and the vibration receiving side and before vibration is added to the liquid filled vibration isolator 1.

As shown in FIGS. 2 and 3, the partition member 7 is integrally connected under a state that the first partition body 3 constituting a portion of a lower surface side of the partition member 7 and the second partition body 9 constituting a portion of an upper surface side of the partition member 7 are overlaid on top and bottom.

The first partition body 8 has an annular orifice formation portion 80 and a substantial disc-shaped retaining portion 81 connected so as to block the lower end side of the orifice formation portion 80. The orifice formation portion 80 and the retaining portion 81 are integrally formed.

The second partition body 9 has an annular portion 90 which is fitted in an inner circumference side of the orifice formation portion 80 and a sectional view of which is formed in L-shaped and a substantial disc-shaped retaining portion 91 connected so as to block a lower end side of the annular portion 90. The annular portion 90 and the retaining portion 91 are integrally formed.

At an upper end side and a lower end side of an outer circumference surface of the orifice formation portion 80, a pair of orifice formation walls 80a, 80b projected toward an outer side in the diameter direction are formed. The orifice formation walls 80a, 80b are contacted with the rubber membrane 30 covering an inner circumference surface of the second mounting member 4 (see FIG. 1), thereby the first orifice P1 is formed along an outer circumference of the partition member 7.

In the orifice formation portion 80, it is formed a vertical wall portion 80c (see FIG. 2) connecting clearance between the orifice formation walls 80a, 80b up and down and the first orifice P1 is divided in circumference direction by this vertical wall portion 80c. At the orifice formation wall 80a, a notch 80d which is notched so as to recess the orifice formation wall 80a to the inner side in the diameter direction is opened and formed. One end of the first orifice P1 is communicated to the first liquid chamber C1 (see FIG. 1) through the notch 80d.

The orifice formation wall 80b is extended over substantial semicircle of the orifice formation portion 80 in case that a connection portion with the vertical wall portion 80c is set to be a start point and a terminal portion 80b1 (see FIG. 2) of the orifice wall formation portion 80b becomes the other end of the flow path of the first orifice P1. That is, the first orifice P1 is communicated with the second liquid chamber C2 (see FIG. 1) at the terminal portion 80b1 of the orifice formation wall 80b.

At the outer circumference end side of the retaining portion 81 in the first partition body 8, a through hole 81a forming the second orifice P2 is opened and formed. The through hole 81a is formed so as to extend in the circumferential direction while penetrating in up and down (see FIG. 4A) and a plurality (four in the present embodiment) of through holes 81a are formed in lining up state so as to be equally spaced in the circumferential direction.

From an upper surface of the retaining portion 81 in the inner circumference side than the through hole 81a, a protrusion portion 81b to retain a retained portion 11 of the elastic movable body 10 is protruded upward. On an upper surface of the protrusion portion 81b, a recessed groove recessed downward is formed (see FIG. 3) and the protrusion portion 81b with the recessed groove is continuously formed in the circumference direction.

The retaining portion 91 of the second partition body 9 is formed in plane symmetry with the retaining portion 81 of the first partition body 8 at both sides of a plane orthogonal with the axis O, except that a through hole 91h mentioned later is formed. Therefore, a through hole 91a and a protrusion portion 81b, which are vertically symmetrical with the through hole 81a and the protrusion portion 81b of the retaining portion 81, are also formed in the retaining portion 91 of the partition body 9.

Further, since the retaining portion 81 and the retaining portion 91 are mutually arranged so as to be separated up and down by a predetermined interval, the second orifice P2 is formed by the through holes 81a, 91a facing up and down. Further, between a clearance formed by the protrusion portions 81b, 91b (recessed groove) facing up and down, a space to retain the retained portion 11 of the elastic movable body 10 is formed.

The retained portion 11 of the elastic movable body 10 is formed into a shape (the shape capable of elastically being fitted) corresponding to the recessed grooves of the protrusion portions 81b, 91b. Therefore, the retained portion 11 is retained by the protrusion portions 81b, 91b, thereby displacement of the retained portion 11 is regulated in both the up and down direction and the diameter direction. Outer side portion than the retained portion 11 in the elastic movable body 10 is projected in the outer side of the diameter direction from the protrusion portions 81b, 91b, thereby arranged on the flow path of the second orifice P2.

As shown in FIG. 3B, the elastic movable body 10 has an outer circumference portion 12 projected in outer side of the diameter direction from the retained portion 11 and a first valve portion 13 and a second valve portion 14 formed in the outer circumference portion 12. Each portion is integrally formed by using rubber elastic body.

The first valve portion 13 is formed into a protrusion shape in which top and bottom pair of protrusions are protruded from both top and bottom surfaces of the outer circumference end of the outer circumference portion 12 and a size D3 of the first valve portion 13 in the up and down direction is set larger than a size D2 of the outer circumference portion 12 in the up and down direction. Further, similarly, the second valve portion 14 is formed into a protrusion shape in which top and bottom pair of protrusions are protruded from both top and bottom surfaces of the outer circumference portion 12 within the inner circumference side than the first valve portion 13 and a size D4 of the second valve portion 14 in the up and down direction is set smaller than the size D2 of the outer circumference portion 12 in the up and down direction and the size D3 of the first valve portion 13 in the up and down direction. The first valve portion 13 and the second valve portion 14 are annular protrusions respectively and continuously formed in the circumference direction.

In the second orifice P2, it is formed a circumference wall surface 80e facing to the first valve portion 13 in the diameter direction and a pair of facing surfaces 81c, 91c projected from both end portions of the up and down direction of the circumference wall surface 80e toward the inner side in the diameter direction and facing to the first valve portion 13 at both sides in the up and down direction. The circumference wall surface 80e is the inner circumference surface of the orifice formation portion 80 and the pair of the facing surfaces 81c, 91c are respectively the upper surface of the retaining portion 81 in the outer circumference side than the through hole 81a and the lower surface of the retaining portion 91 in the outer circumference side than the through hole 91a.

That is, the first valve portion 13 and the second valve portion 14 are arranged in outer side of the diameter direction than the through holes 81a, 91a of the retaining portions 81, 91 and the portion at the inner circumference side than the second valve portion 14 in the outer circumference portion 12 faces to the through holes 81a, 91a in the up and down direction. Therefore, liquid pressure of liquid flowing the second orifice P2 work on the outer circumference portion 12 arranged in the inner circumference side of the second valve portion 14.

In this case, the size D1 in the diameter direction of the outer circumference portion 12 (the size in the left and right direction of FIG. 3B and of the portion not retained by the protrusion portion 81b, 91b) is set larger than the size D2 in the up and down direction of the outer circumference portion 12 (the size of thickness in the axis-O direction) and is set larger than a size that the size D2 in the up and down direction of the outer circumference portion 12 and a pair of the size D3 in the up and down direction of the first valve portion 13 are added (D2+D3x2). Therefore, as shown in FIG. 5, when liquid pressure works on the outer circumference portion 12, whole of the outer circumference portion 12 deforms so as to bend and according to deformation thereof, the first valve portion 13 displaces in the up and down direction (see FIG. 5B and FIG. 5C).

In the load state before vibration is input (state of FIG. 5A), since the first valve portion 13 and the facing surfaces 81c, 91c are separated, the first valve portion 13 displaces in the up and down direction and the first valve portion 13 separates from or contacts with the facing surfaces 81c, 91c. Thereby, communication state and blocking state of the second orifice P2 are switched. As mentioned, based on that whole of the outer circumference portion 12 deforms, it can be restrained that stress is concentrated in a part of the outer circumference portion 12 during deformation. Therefore, even if deformation is repeated in the outer circumference portion 12, cracks are less likely to occur in the outer circumference portion 12. As a result, durability of the elastic movable body 10 can be improved.

Further, in the area where the first valve portion 13 and the second valve portion 14 are not formed, since the size D2 in the up and down direction of the outer circumference portion 12 (see FIG. 3B) is constantly formed from the inner circumference side toward the outer circumference side, in a case that the outer circumference portion 12 is deformed, it can be effectively restrained that stress concentrates in a part of the outer circumference portion 12.

Further, since the first valve portion 13 is formed so as to be tapered as going to the end in the up and down direction (top portion), it can be made a small contact area at the time of contact with the facing surfaces 81c, 91c. Therefore, it can be restrained that abnormal noise occurs at the time of contact of the first valve portion 13 and the facing surfaces 81c, 91c.

Here, due to deformation of the outer circumference portion 12, although the first valve portion 13 also displaces (deforms) so as to slightly fall down toward the outer side in the diameter direction, a clearance between the first valve portion 13 and the circumference wall surface 80e before vibration is input is sufficiently secured to an extent that the first valve portion 13 and the circumference wall surface 80e do not mutually contact at the time of deformation of the first valve portion 13.

Here, at the time of vibration input with a small amplitude (high frequency) such as idle vibration, deformation amount of the outer circumference portion 12 is small and the first valve portion 13 displaces in the up and down direction while retaining a state that the first valve portion 13 and the facing surfaces 81c, 91c separate, thus liquid flow in the second orifice P2 occurs. At that time, although the clearance between the first valve portion 13 and the facing surfaces 81c, 91c becomes a substantial flow path of the second orifice P2, the clearance between the first valve portion 13 and the facing surfaces 81c, 91c is slight in the load state before vibration is input (for example, 0.1 mm).

Namely, a substantial flow path sectional area of the second orifice P2 (a flow path sectional area between the first valve portion 13 and the facing surfaces 81c, 91c) is formed smaller than the flow path sectional area of the first orifice P1 (see FIG. 3A). Further, a flow path length of the second orifice P2 is formed shorter than a flow path length of the first orifice P1. Therefore, a liquid column resonance frequency occurring in the second orifice P2 is set higher than a liquid column resonance frequency occurring in the first orifice P1.

Therefore, based on that communication state of the second orifice P2 is maintained (the first valve portion 13 does not contact with the facing surfaces 81c, 91c) when vibration with a small amplitude (for example, 0.05 mm) is input, the dynamic spring constant can be made low through liquid flow in the second orifice P2. Further, when vibration with a large amplitude (for example, an amplitude of 0.5 mm) such as shake vibration is input, the second orifice P2 is blocked by the first valve portion 13 and liquid flow occurs in the first orifice P1, thereby the attenuation coefficient can be raised.

Further, in the present embodiment, when vibration with the medium amplitude (the predetermined first amplitude) between the above large amplitude and the small amplitude is input, it is constituted that a predetermined attenuation coefficient can be obtained while the dynamic spring constant is made low. This constitution will be described below.

As shown in FIG. 4, on a facing surface 81c of the retaining portion 81, a recess portion 81d recessed from the facing surface 81c is formed. A plurality (eight in the present embodiment) of recess portions 81d are formed so as to be equally spaced in the circumference direction. Further, in the retaining portion 91 of the second partition body 9, a recess portion 91d is formed at a position which is vertically symmetrical with the recess portion 81d (see FIG. 4B). These recess portions 81d, 91d are formed so as to extend in the diameter direction and the recess portions 81d, 91d and the first valve portion 13 are arranged so as to mutually face in the up and down direction. Thereby, in a case that the first valve portion 13 contacts with the facing surfaces 81c, 91c, it can be formed a leak flow path L (see FIG. 5) maintaining the communication state of the second orifice P2.

Therefore, as shown in FIG. 5B, when vibration with a medium amplitude (for example, 0.1 mm) to an extent that the first valve portion 13 and the facing surfaces 81c, 91c contact is input, liquid flow within the second orifice P2 can be slightly produced through the leak flow path L. On the other hand, since liquid flow within the second orifice P2 is a little, liquid flow can be also produced within the first orifice P1 (see FIG. 1). Therefore, a predetermined attenuation coefficient can be obtained while restraining that the dynamic spring constant becomes high.

Further, as shown in FIG. 5C, when vibration with a comparatively large amplitude (the second amplitude larger than the first amplitude) is input, the leak flow path L is blocked by the first valve portion 13, thus it can be restrained that liquid flow is produced in the second orifice P2. Thereby, since the liquid flow can be produced by only the first orifice P1, it can be obtained a high attenuation coefficient.

As mentioned, in the present embodiment, although the leak flow path L is formed by recess portions 81d, 91d of the facing surfaces 81c, 91c, for example, the recess portion corresponding to the recess portions 81d, 91d can be formed in the top portion of the first valve portion 13. However, in case of the above constitution, since the first valve portion 13 is formed by using rubber elastic body, dimensional accuracy of the flow path width or the depth of the leak flow path L is easily lowered. Further, in a case that the recess portion is formed in the first valve portion 13, cracks are easily produced and durability of the elastic movable body 10 is lowered.

On the contrary, in the present embodiment, since the leak flow path L is formed by the recess portions 81d, 91d of the facing surfaces 81c, 91c, dimensional accuracy of the flow path width or the depth of the leak flow path L can be improved, in comparison with a case that the recess portion is formed in the first valve portion 13. Therefore, since flow amount of liquid passing the leak flow path L can be easily set to the intended flow amount, when vibration with the medium amplitude is input (the state shown in FIG. 5B), the intended dynamic spring constant and the attenuation coefficient can be easily obtained. Further, comparing with a case that the recess portion is formed in the first valve portion 13, durability of the elastic movable body 10 can be improved.

Here, as mentioned in the above, in the present embodiment, the second valve portion 14 is formed in the inner side in the diameter direction than the first valve portion 13. This second valve portion 14 is a portion to raise rigidity of the outer circumference portion 12 by contact with the facing surfaces 81c, 91c.

As shown in FIG. 5A, a facing clearance of the second valve portion 14 and the facing surface 81c, 91c under a load state before vibration is input is set wider than a facing clearance of the first valve portion 13 and the facing surface 81c, 91c. Therefore, as shown in FIG. 5B, in a case that vibration with the medium amplitude is input, it can be restrained that the second valve portion 14 and the facing surface 81c, 91c mutually contact. Thereby, it can be restrained that rigidity of the outer circumference portion 12 becomes high and it can be absorbed that liquid pressure working on the outer circumference portion 12 by deformation of the outer circumference portion 12. Therefore, it can be restrained that the dynamic spring constant becomes high.

On the other hand, as shown in FIG. 5C, when vibration with the large amplitude is input, durability of the outer circumference portion 12 of the elastic movable body 10 can be raised by contacting the second valve portion 14 and the facing surface 81c, 91c. Thereby, since it can be restrained that liquid pressure at the time of vibration input is adsorbed by deformation of the outer circumference portion 12, higher attenuation coefficient can be obtained when vibration with the large amplitude is input.

Further, since the second valve portion 14 is formed in a tapered shape as going to the end portion (top end side) in the up and down direction, the contact area of the second valve portion 14 and the facing surfaces 81c, 91c can be made small in comparison with a case that the second valve portion 14 and the facing surfaces 81c, 91c mutually contact by surface contact. Therefore, it can be restrained that abnormal sound occurs when the second valve portion 14 and the facing surfaces 81c, 91c contact.

Toward the outer circumference end from the inner circumference end of the facing surfaces 81c, 91c, the recess portions 81d, 91d are formed so as to extend in the diameter direction. That is, the leak flow path L is also formed in an area between the recess portions 81d, 91d and the second valve portion 14. Thereby, even if the second valve portion 14 and the facing surfaces 81c, 91c contact when vibration with the medium amplitude is input (the state of FIG. 5B), liquid flow can be produced in the second orifice P2 through the leak flow path L formed between the second valve portion 14 and the recess portions 81d, 91d. Therefore, when vibration with the medium amplitude is input, it can be securely exerted the effect to obtain a predetermined attenuation coefficient while restraining that the dynamic spring constant becomes high.

On the other hand, when vibration with the large amplitude is input, as shown in FIG. 5C, the leak flow path L is blocked by the second valve portion 14. Thereby, even if blocking of the leak flow path L by the first valve portion 13 is partially insufficient, it can be restrained that liquid flow occurs in the second orifice P2. Therefore, it can be securely obtained the high attenuation coefficient when vibration with the large amplitude is input.

Further, as shown in FIG. 4A, a width size (that is, a flow path width of the leak flow path L) of the recess portions 81d, 91d in the circumference direction is formed narrower as going to the inner side in the diameter direction. Therefore, when the first valve portion 13, the second valve portion 14, and facing surfaces 81c, 91c contact with each other, even if there is a position that blocking of the leak flow path L (see FIG. 5) by the first valve portion 13 and the second valve portion 14 is insufficient, it can be raised flow resistance of liquid flowing in such above position. Therefore, it can be securely obtained the high attenuation coefficient when vibration with the large amplitude is input.

Further, as shown in FIG. 4B, the facing surfaces 81c, 91c and a bottom surface of the recess portions 81d, 91d are connected by slope surfaces 81e, 91e in the circumference direction. These slope surfaces 81e, 91e are sloped so that a level difference portion of the facing surfaces 81c, 91c and the bottom surface of the recess portions 81d, 91d is smoothly connected. Thereby, the leak flow path L (see FIG. 5) can be easily blocked when the first valve portion 13, the second valve portion 14, and the facing surfaces 81c, 91c contact. Therefore, the high attenuation coefficient can be securely obtained when the vibration with large amplitude is input.

Here, among a plurality of the through holes 81a, 91a line up in the circumference direction, ribs 81f, 91f extended in the diameter direction are formed (as for the rib 91f, see FIG. 2). These ribs 81f, 91f connect an outer circumference portion than the through holes 81a, 91a in the retaining portion 81, 91 to the protrusion portion 81b, 91b. Further, as shown in FIG. 3A, in the area where the ribs 81f, 91f are formed, the outer circumference portion 12 is retained in a state that the outer circumference portion 12 is sandwiched by a top and bottom pair of the ribs 81f, 91f.

Since deformation of the outer circumference portion 12 is constrained by the ribs 81f, 91f, blocking of the leak flow path L (see FIG. 5) by the first valve portion 13 and the second valve portion 14 may become insufficient near the area where the ribs 81f, 91f are formed. On the contrary, in the present embodiment, as shown in FIG. 4A, the recess portions 81d, 91d are not formed on the facing surfaces 81c, 91c arranged in the outer side in the diameter direction of the ribs 81f, 91f.

Namely, since the recess portions 81d, 91d are formed in the position different from the ribs 81f, 91f in the circumference direction (phase is shifted in the circumference direction), the leak flow path L (see FIG. 5) is formed in the area where deformation of the outer circumference portion 12 is not constrained. Therefore, the leak flow path L is easily blocked by displacement of the first valve portion 13 and the second valve portion 14 according to deformation of the outer circumference portion 12. Therefore, it can be surely exerted the effect that the high attenuation coefficient can be obtained when vibration with the large amplitude is input.

As mentioned, in the present embodiment, it is constituted that the leak flow path L is blocked (the second orifice P2 is blocked) when vibration with the large amplitude is input. In this case, when vibration with an excessive amplitude larger than the above large amplitude is input, liquid pressure of the first liquid chamber C1 and the second liquid chamber C2 (see FIG. 1) is rapidly changed and liquid pressure of the first liquid chamber C1 is easily and rapidly lowered. Due to this lowering of liquid pressure, when the first liquid chamber C1 becomes negative pressure, cavitation may occur to cause abnormal sound. However, this cavitation is restrained through a movable stopper portion 15 (see FIG. 3A) in the inner circumference side of the retained portion 11 in the elastic movable body 10.

As shown in FIG. 3A, in the inner circumference side than the protrusion portions 81b, 91b of the retaining portion 81, 91, it is formed a space capable of storing the movable stopper portion 15. The portion of the elastic movable body 10 that is stored in this space (the portion nearer to the center side than the retained portion 11) is the movable stopper portion 15. The movable stopper portion 15 is integrally formed with the retained portion 11.

In the movable stopper portion 15, an annular valve portion 16 projected annularly in the up and down direction and a through hole 17 arranged in the outer circumference side of the annular valve portion 16. Under a load state before vibration is input, upper and lower top portions of the annular valve portion 16 respectively contact with the upper surface of the retaining portion 81 and the lower surface of the retaining portion 91.

In the center portion of the retaining portions 81, 91 arranged in the inner circumference side than the annular valve portion 16, through holes 81g, 91g are respectively formed and a through hole 91h is formed in the retaining portion 91 arranged in the outer circumference side of the annular valve portion 16. The through hole 91h is formed at the upper side of the through hole 17 (the position facing to the movable stopper portion 15).

Thereby, when the first liquid chamber C1 (see FIG. 1) becomes negative pressure, the movable stopper portion 15 displaces upward so that the annular valve portion 16 projected upward is squashed toward the retaining portion 91 side. With displacement of this movable stopper portion 15, a clearance occurs between the annular valve portion 16 projected downward and the retaining portion 81. Thereby, liquid flow can be conducted through the clearance, the through hole 17 of the movable stopper portion 15, and the through hole 91h of the retaining portion 91. Thereby, since negative pressure occurring in the first liquid chamber C1 can be early dissolved, it can be restrained occurrence of abnormal noise due to the cavitation.

As mentioned above, according to the liquid-filled vibration isolator 1 of the present embodiment, the dynamic spring constant can be lowered when vibration with the small amplitude (0.05 mm) is input and a predetermined attenuation coefficient can be obtained while restraining that the dynamic spring constant becomes high when vibration with the medium amplitude (0.1 mm) is input. Further, when vibration with the large amplitude (0.5 mm) is input, the high attenuation coefficient can be obtained and when vibration with the excessive amplitude (over 0.5 mm) is input, it can be restrained occurrence of abnormal sound due to cavitation.

Although the present invention is described based on the above embodiment, the present invention is not limited to the above embodiment and it can be easily guessed that various modifications and improvements can be done within a scope not deviating from aim of the present invention.

In the above embodiment, although it is described a case using the liquid-filled vibration isolator 1 as an engine mount elastically supporting an auto engine, it is not necessarily limited to this. For example, the liquid-filled vibration isolator 1 can be adopted for a voluntary vibration body such as body mount, differential mount.

In the above embodiment, although it is described a case that two the first orifice P1 and the second orifice P2 communicating the first liquid camber C1 and the second liquid chamber C2 are formed, another orifice communicating the first liquid chamber C1 and the second liquid chamber C2 may be formed in addition to the first orifice P1 and the second orifice P2.

In the above embodiment, although it is described a case that the first valve portion 13 and the second valve portion 14 are formed in the outer circumference portion 12 of the elastic movable body 10, it is not necessarily limited to this. For example, the second valve portion 14 may be omitted and a valve portion contactable with the facing surfaces 81*c*, 91*c* may be provided further in addition to the first valve portion 13 and the second valve portion 14.

In the above embodiment, although it is described a case that the thickness of the outer circumference portion 12 is constantly formed in the area where the first valve portion 13 and the second valve portion 14 are not formed, it is not limited to this. The thickness of the outer circumference portion 12 may be partially thinned to an extent that the outer circumference portion 12 is wholly deformed so as to bend when the liquid pressure works and communication state of the second orifice P2 can be switched by up and down displacement of the first valve portion 13 and the second valve portion 14.

In the above embodiment, although it is described a case the movable stopper portion 15 is connected to the inner circumference side of the retained portion 11 of the elastic movable body 10, it is not necessarily limited to this. For example, it may be conceivable a constitution that the movable stopper portion 15 is omitted (the thickness of the elastic movable body 10 in the inner circumference side than the retained portion 11 is made constant). In this case, the through holes 81*g*, 91*g*, 91*h* of the retaining portions 81, 91 may be omitted.

In the above embodiment, although it is exemplified vibration with the amplitude of 0.05 mm as vibration that the first valve portion 13 does not contact with the facing surfaces 81*c*, 91*c*, vibration with the amplitude of 0.1 mm (the predetermined first amplitude) as vibration that the first valve portion 13 contacts with the facing surfaces 81*c*, 91*c* and vibration with the amplitude of 0.5 mm (the second amplitude larger than the first amplitude) as vibration that the first valve portion 13 blocks the leak flow path L, it is not necessarily limited to this. So that the first valve portion 13 with a desirable amplitude contacts with the facing surfaces 81*c*, 91*c* (blocks the leak flow path L), that is, it can be obtained the intended spring constant or the attenuation coefficient when vibration with the desirable amplitude is input, a clearance between the first valve portion 13 and the facing surfaces 81*c*, 91*c* and a depth of the recess portions 81*d*, 91*d* may be set as appropriate.

In the present embodiment, although it is described a case that the facing clearance with the facing surfaces 81*c*, 91*c* is set wider in the second valve portion 14 than in the first valve portion 13, it is not necessarily limited to this. For example, the facing clearance with the facing surfaces 81*c*, 91*c* may be set to the same value in both the first valve portion 13 and the second valve portion 14. Even in this case of the above constitution, since the outer circumference portion 12 is deformed so as to wholly bend, the first valve portion 13 can be earlier contacted with the facing surfaces 81*c*, 91*c* than the second valve portion 14.

In the above embodiment, it is described a case that the leak flow path L is formed through the recess portions 81*d*, 91*d* of the facing surfaces 81*c*, 91*c*, it is not necessarily limited to this. For example, the leak flow path L may be formed by forming a recess corresponding to the recess portions 81*d*, 91*d* in the top of the first valve portion 13 (the second valve portion 14) and a through hole in the diameter direction in first valve portion 13 (the second valve portion 14). Further, the leak flow path L may be respectively formed in the facing surfaces 81*c*, 91*c* and the first valve portion 13 (the second valve portion 14).

Further, it may be conceivable that, for example, the rubber membrane extending in the circumference direction is formed on the surface of the facing surfaces 81*c*, 91*c* and the recess portions 81*d*, 91*d* may be formed on the surface of the rubber membrane without forming the recess portions 81*d*, 91*d* directly on the surface of the facing surfaces 81*c*, 91*c*. Further, it may be a constitution that rubber protrusion portions (protrusion) are intermittently formed in an aligned state in the circumference direction on the surface of the facing surfaces 81*c*, 91*c* and the clearance between the two protrusion portions is made a leak flow path. As mentioned, in a case that the leak flow path is formed by using the rubber adhered to the facing surfaces 81*c*, 91*c*, it can be restrained abnormal sound occurring at the contact with the first valve portion 13 (the second valve portion 14).

In the above embodiment, although it is described a case that a plurality of the recess portions 81*d*, 91*d* (the leak flow path L) are provided and aligned so as to be equally spaced in the circumference direction, it is not necessarily limited to this. For example, the recess portions 81*d*, 91*d* (the leak flow path L) may be only one and the recess portions 81*d*, 91*d* (the leak flow path L) may be omitted. Further, in a case that a plurality of the recess portions 81*d*, 91*d* are provided, it is not necessarily provided the recess portions 81*d*, 91*d* so as to be equally spaces in the circumference direction (it is good to intermittently provide in the circumference direction).

In the above embodiment, although it is described a case that the recess portions 81*d*, 91*d* (the leak flow path L) is formed so as to respectively face to the first valve portion 13 and the second valve portion 14, it is not necessarily limited to this. For example, it may be constituted that the recess portions 81*d*, 91*d* (the leak flow path L) are formed in only the facing portion toward the first valve portion 13.

In the above embodiment, although it is described a case that the width size of the recess portions 81*d*, 91*d* in the circumference direction (namely, the flow path width of the leak flow path L) is formed narrower as going to the inner side in the diameter direction, it is not necessarily limited to this. For example, it may be conceivable that the width size (namely, the flow path width of the leak flow path L) of the recess portions 81*d*, 91*d* in the circumference direction is made constant from the inner side to the outer side in the diameter direction and is made wider as going to the inner side in the diameter direction.

In the above embodiment, although it is described a case that the recess portions 81*d*, 91*d* (the leak flow path L) is formed at the position different from the ribs 81*f*, 91*f* in the circumference direction, it is not necessarily limited to this. For example, the recess portions 81*d*, 91*d* (the leak flow path L) may be formed in the outer area of the ribs 81*f*, 91*f* in the diameter direction.

The invention claimed is:
1. A liquid-filled vibration isolator comprising:
a first mounting member;
a cylindrical second mounting member;
a vibration isolation body comprising rubber elastic body, and connecting the first mounting member with the second mounting member so as to block an opening portion of one end side of the second mounting member in an axis direction;
a diaphragm comprising rubber elastic body, and blocking an opening portion of another end side of the second mounting member in the axis direction;

a partition member retained within an inner circumference side of the second mounting member between the diaphragm and the vibration isolation body, and partitioning a liquid chamber into a first liquid chamber at a side of the vibration isolation body and a second liquid chamber at a side of the diaphragm;

an orifice portion formed in the partition member, and communicating the first liquid chamber to the second liquid chamber; and a disc-shaped elastic movable body stored in the partition member and comprising rubber elastic body;

wherein the orifice portion comprises at least a first orifice and a second orifice resonating with higher frequency than the first orifice, wherein the elastic movable body comprises a retained portion constituting a part of an inner circumference side of the elastic movable body and retained in the partition member, an outer circumference portion protruding outwardly in a diameter direction from the retained portion and arranged in a flow path of the second orifice, and a first valve portion protruding upwardly and downwardly in the axis direction from an outer circumference end side of the outer circumference portion, wherein the second orifice comprises a circumference wall surface facing the first valve portion in the diameter direction and forming a flow path with the first valve portion, wherein a size of the outer circumference portion in the diameter direction is larger than a size of the outer circumference portion in the axis direction, wherein the second orifice comprises a pair of facing surfaces protruding inwardly in the diameter direction from the circumference wall surface, and facing the first valve portion on both sides in the axis direction, wherein the first valve portion and the facing surfaces are configured in such a manner that contact of the first valve portion with the facing surfaces causes the second orifice to be in a blocking state in which liquid flow cannot be done through the second orifice, and that separation of the first valve portion from the facing surfaces causes the second orifice to be in a communication state in which liquid flow can be done through the second orifice, a leak flow path formed in at least one of the first valve portion or the facing surface, the leak flow path maintaining the communication state of the second orifice in a case that the first valve portion contacts with the facing surface when vibration with a first predetermined amplitude is input, the leak flow path maintains the communication state between the first liquid chamber and the second liquid chamber thorough the second orifice, the leak flow path is formed by a recess portion formed on the facing surfaces, wherein a plurality of the recess portions are formed in the circumference direction, and a slope surface connecting the facing surfaces with a bottom surface of the recess portion in the circumference direction, wherein both ends of the bottom surface in the circumference direction and the facing surfaces are connected by the slope surface.

2. The liquid-filled vibration isolator according to claim 1, wherein the first valve portion and the facing surfaces are configured in such a manner that the leak flow path is formed so as to be able to be blocked by the first valve portion in a state where vibration with a second amplitude larger than the first amplitude is input into the liquid-filled vibration isolator.

3. The liquid-filled vibration isolator according to claim 2, wherein the elastic movable body comprises a second valve portion formed in an inner circumference side than the first valve portion and protruded in both sides in the axis direction from the outer circumference portion,
wherein the second valve portion faces of the facing surfaces in the axis direction, and
wherein a facing clearance of the second valve portion and the facing surfaces is formed wider than a facing clearance of the first valve portion and the facing surfaces.

4. The liquid-filled vibration isolator according to claim 3, wherein the second valve portion is configured to contact the facing surfaces in a state where vibration with the second amplitude is input into the liquid-filled vibration isolator.

5. The liquid-filled vibration isolator according to claim 3, wherein the second valve portion and the facing surfaces are configured in such a manner that contact of the second valve portion with the facing surfaces forms a leak flow path in at least one of the second valve portion and the facing surfaces, and that the leak flow path maintains the communication state of the second orifice.

6. The liquid-filled vibration isolator according to claim 5, wherein the leak flow path is formed so as to be able to be blocked by the second valve portion in a state where vibration with the second amplitude is input into the liquid-filled vibration isolator.

7. The liquid-filled vibration isolator according to claim 1, wherein the leak flow path is configured in such a manner that a flow path width of the leak flow path becomes narrower as the leak flow path goes inwardly in the diameter direction.

8. The liquid-filled vibration isolator according to claim 1, wherein the partition member comprises a sandwich portion to sandwich a part of the outer circumference portion in the circumference direction from up and down direction, and
wherein the leak flow path is formed at a position different from the sandwich portion in the circumference direction.

* * * * *